US012718305B2

(12) United States Patent
Park

(10) Patent No.: US 12,718,305 B2
(45) Date of Patent: Aug. 25, 2026

(54) METHOD OF PROVIDING DIGITAL TWIN SERVICE BASED ON REALITY VERIFICATION

(71) Applicant: Moon Kwan Park, Seoul (KR)

(72) Inventor: Moon Kwan Park, Seoul (KR)

( * ) Notice: Subject to any disclaimer, the term of this patent is extended or adjusted under 35 U.S.C. 154(b) by 12 days.

(21) Appl. No.: 18/710,834

(22) PCT Filed: Nov. 8, 2022

(86) PCT No.: PCT/KR2022/017394

§ 371 (c)(1),
(2) Date: May 16, 2024

(87) PCT Pub. No.: WO2023/090742

PCT Pub. Date: May 25, 2023

(65) Prior Publication Data

US 2025/0014126 A1 Jan. 9, 2025

(30) Foreign Application Priority Data

Nov. 16, 2021 (KR) ........................ 10-2021-0158090
Nov. 3, 2022 (KR) ........................ 10-2022-0145361

(51) Int. Cl.
*G06Q 50/10* (2012.01)
*G06K 19/06* (2006.01)
*H04W 4/029* (2018.01)

(52) U.S. Cl.
CPC ....... *G06Q 50/10* (2013.01); *G06K 19/06009* (2013.01); *H04W 4/029* (2018.02)

(58) Field of Classification Search
CPC .. G06K 19/06009; G06Q 50/10; H04W 4/029
See application file for complete search history.

(56) References Cited

U.S. PATENT DOCUMENTS

2014/0179313 A1* 6/2014 Orton .................... H04W 4/029
455/456.2
2017/0019264 A1* 1/2017 Nugent ................... H04L 67/52
(Continued)

FOREIGN PATENT DOCUMENTS

JP 2004-257872 A 9/2004
KR 10-2013-0005899 A 1/2013
(Continued)

OTHER PUBLICATIONS

International Search Report dated Feb. 24, 2023 in International Application No. PCT/KR2022/017394.

*Primary Examiner* — June Sison
(74) *Attorney, Agent, or Firm* — KORUS Patent, LLC; Seong Il Jeong

(57) ABSTRACT

Proposed is a method of providing a digital twin service based on reality verification. The method includes receiving, by a first server, workplace information including a workplace location from a first application running on a mobile terminal of a first user who manages a workplace existing in the real world, and registering the workplace information newly, and forwarding, by the first server, the workplace information newly registered in a database to a second server that online services a metaverse obtained by digitizing the real world so that a virtual workplace for the workplace is implemented at the same location in the metaverse.

8 Claims, 9 Drawing Sheets

(56) References Cited

U.S. PATENT DOCUMENTS

| | | | | |
|---|---|---|---|---|
| 2019/0173745 | A1* | 6/2019 | Rjeili | H04M 1/72454 |
| 2020/0090206 | A1* | 3/2020 | Park | G05D 1/101 |
| 2021/0201584 | A1* | 7/2021 | Ha | G06V 10/80 |
| 2025/0141679 | A1* | 5/2025 | Hwang | G06F 9/3836 |

FOREIGN PATENT DOCUMENTS

| | | | |
|---|---|---|---|
| KR | 10-2020-0110031 | A | 9/2020 |
| KR | 10-2021-0036212 | A | 4/2021 |
| KR | 10-2021-0085789 | A | 7/2021 |
| KR | 10-2022-0125694 | A | 9/2022 |

* cited by examiner

METHOD OF PROVIDING DIGITAL TWIN SERVICE BASED ON REALITY VERIFICATION

CROSS-REFERENCE TO RELATED APPLICATIONS

This application is the U.S. national stage application of International Patent Application No. PCT/KR2022/017394, filed Nov. 8, 2022, which claims the benefit under 35 U.S.C. § 119 of Korean Application Nos. 10-2021-0158090, filed Nov. 16, 2021; and 10-2022-0145361, filed Nov. 3, 2022; the disclosures of each of which are incorporated herein by reference in their entirety.

TECHNICAL FIELD

The present disclosure relates to a metaverse, and in particular to a metaverse obtained by digitalizing the real world, rather than a virtual metaverse unrelated to the real world.

BACKGROUND ART

Korean Patent Application Publication No. 10-2022-0125694 discloses a method and an apparatus for user interaction based on digital twin. The method and the apparatus enable users to interact with each other on the basis of a virtual reality space established using a digital twin technology. In addition, the method and the apparatus enable a virtual-reality terminal user and an augmented-reality terminal user to interact naturally with each other, and enable any one of the users to track the location and movement of the other user and accurately represent the location and movement on the virtual-reality terminal or the augmented-reality terminal.

DISCLOSURE

Technical Problem

The present disclosure is directed to providing a method for securing a true digital twin by verifying the existence and locations of offline workplaces in real life and achieving implementation on a metaverse on the basis of verification.

Technical Solution

According to an aspect, there is provided a method of providing a digital twin service based on reality verification, the method including: receiving, by a first server, workplace information including a workplace location from a first application running on a mobile terminal of a first user who manages a workplace existing in the real world, and registering the workplace information newly; and forwarding, by the first server, the workplace information newly registered in a database to a second server that online services a metaverse obtained by digitizing the real world so that a virtual workplace for the workplace is implemented at the same location in the metaverse.

The method of providing the digital twin service based on reality verification may further include: issuing, by the first server, a workplace code including location data of the workplace to the first user of the workplace newly registered so that the workplace code is provided in the workplace; obtaining, by the first application, the workplace code provided in the workplace; transmitting, by the first application, business status information of the workplace to the first server when a location of the mobile terminal of the first user and the location data included in the obtained workplace code match; and forwarding, by the first server, the business status information received from the first application to the second server so that a business status of the offline workplace is recognized through the virtual workplace in the metaverse.

The method of providing the digital twin service based on reality verification may further include: obtaining, by a second application running on a mobile terminal of a second user who has visited the workplace, the workplace code provided in the workplace; granting, by the second application, an evaluation right for the workplace to the second user when a location of the mobile terminal of the second user and the location data of the obtained workplace code match; uploading, by the second application, workplace evaluation information input from the second user to which the evaluation right is granted, to the first server; and forwarding, by the first server, the uploaded workplace evaluation information to the second server so that the workplace evaluation information is provided to visitors to the virtual workplace in the metaverse.

Advantageous Effects

According to the present disclosure, a digital twin based on reality verification can be achieved.

MODE FOR INVENTION

The aforementioned and additional aspects of the present disclosure will become more apparent through exemplary embodiments described with reference to the accompanying drawings. Hereinafter, the present disclosure will be described in detail with reference to the embodiments so that those skilled in the art can easily understand and reproduce the embodiments.

Figure 1:
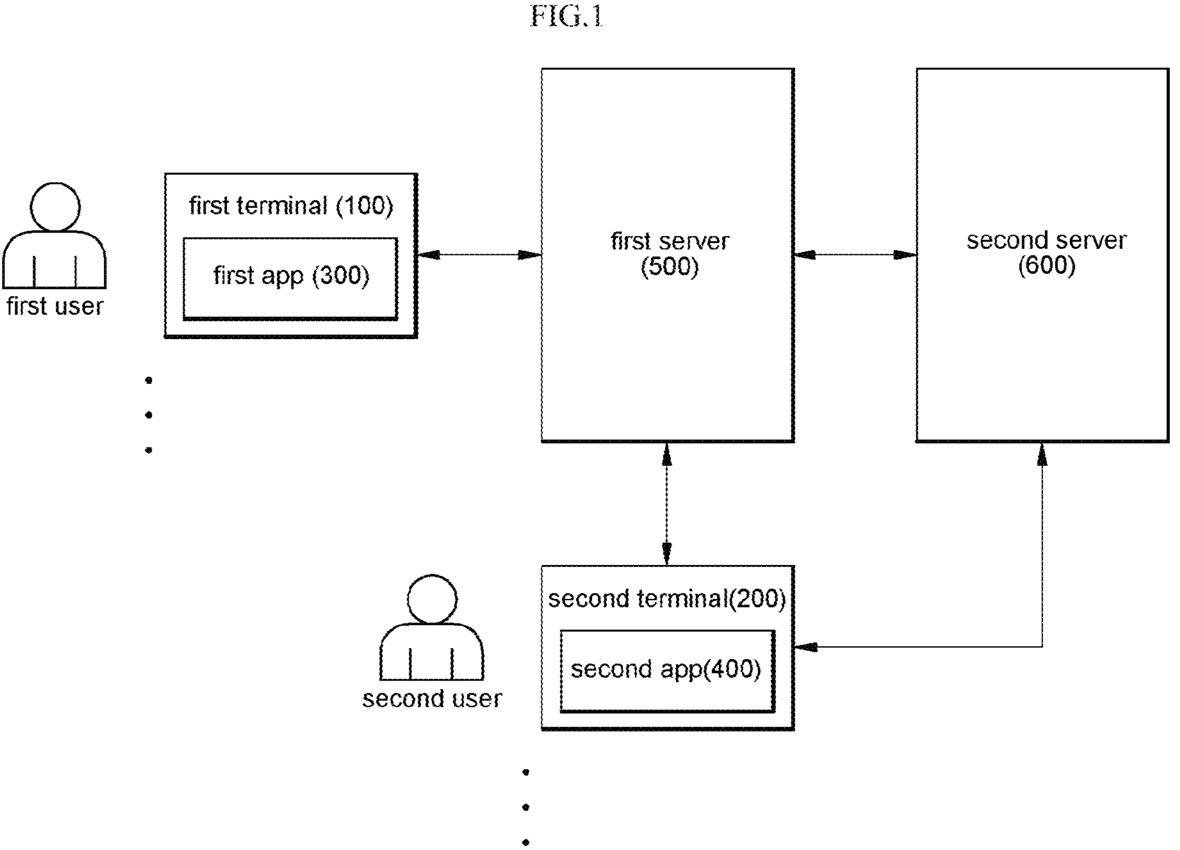
FIG. 1 is a block diagram illustrating a system for providing a digital twin service based on reality verification according to an embodiment.

FIG. 1 is a block diagram illustrating a system for providing a digital twin service based on reality verification according to an embodiment. A first terminal 100 and a second terminal 200 are both mobile terminals, such as smartphones, and are classified according to the subject of use. A first user who uses the first terminal 100 refers to a person who manages an offline workplace (store), and means a business owner or a special manager (employee) acting on behalf of the business owner. A second user who uses the second terminal 200 means a general user (consumer) who may visit the offline workplace or access a metaverse online for use. In addition, in the first terminal 100, a first application 300 for providing a digital twin service based on reality verification for the first user may be installed and run. In the second terminal 200, a second application 400 for providing a digital twin service based on reality verification for the second user may be installed and run. The first application 300 and the second application 400 may be substantially the same application, and may be available to users with different rights to use granted depending on whether a user is the first user or the second user.

The first server 500 and the second server 600 are server systems each including at least one server computing device, and operate under a variety of operating systems including Windows-based operating systems, MacOS, Java, UNIX, LINUX, or others. The first server 500 may be in conjunction with the first application 300 to verify the existence and location of an offline workplace, and may be in conjunction with the second application 400 to verify the second users' on-site visits to the workplace. In addition, the second server 600 is a server that operates a metaverse, and applies results verified through the first server 500 to the metaverse so that a true digital twin is serviced online to the second users. For reference, the second server 600 implements a virtual workplace corresponding to an offline workplace at the same location in the metaverse, and provides a service that enables the users to purchase or reserve tangible and intangible goods sold in the offline workplace through the virtual workplace.

Figure 2:
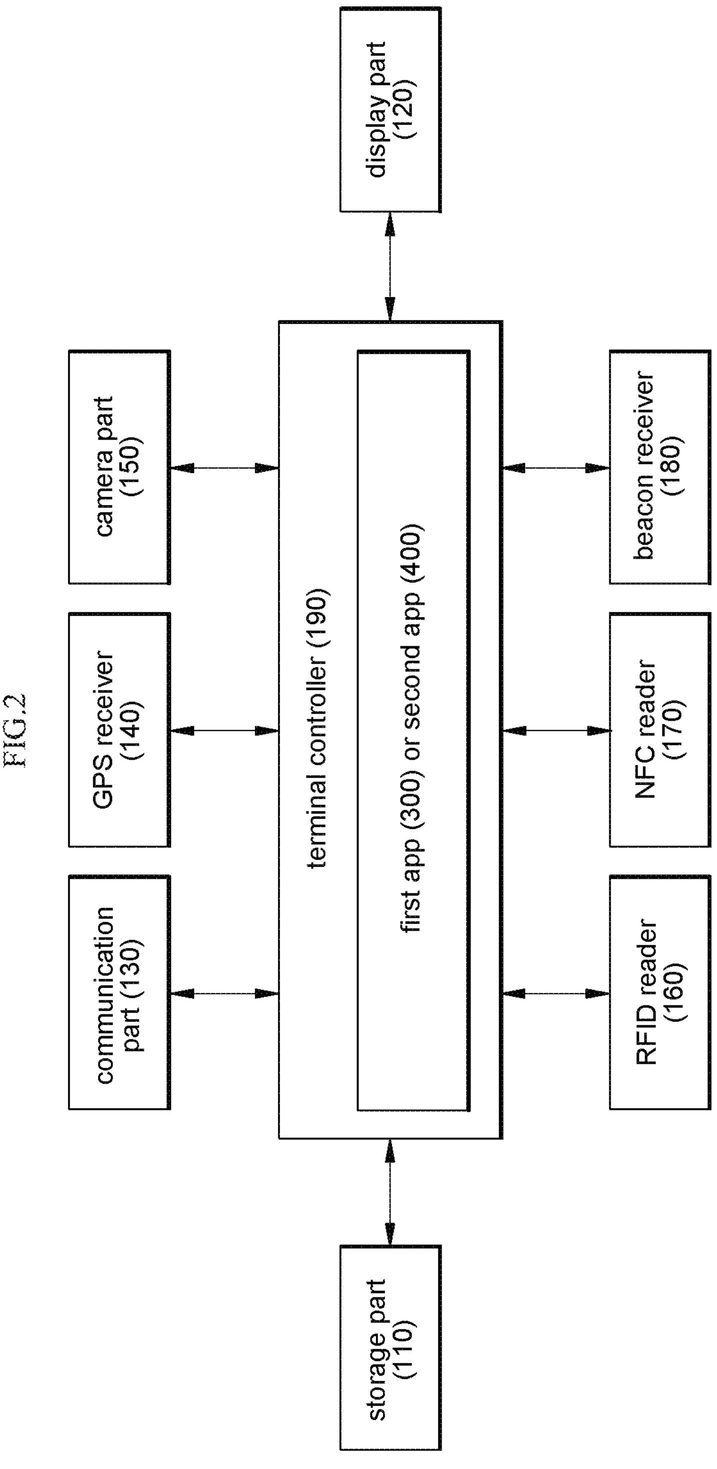
FIG. 2 is a block diagram illustrating a mobile terminal according to an embodiment.
Figure 3:
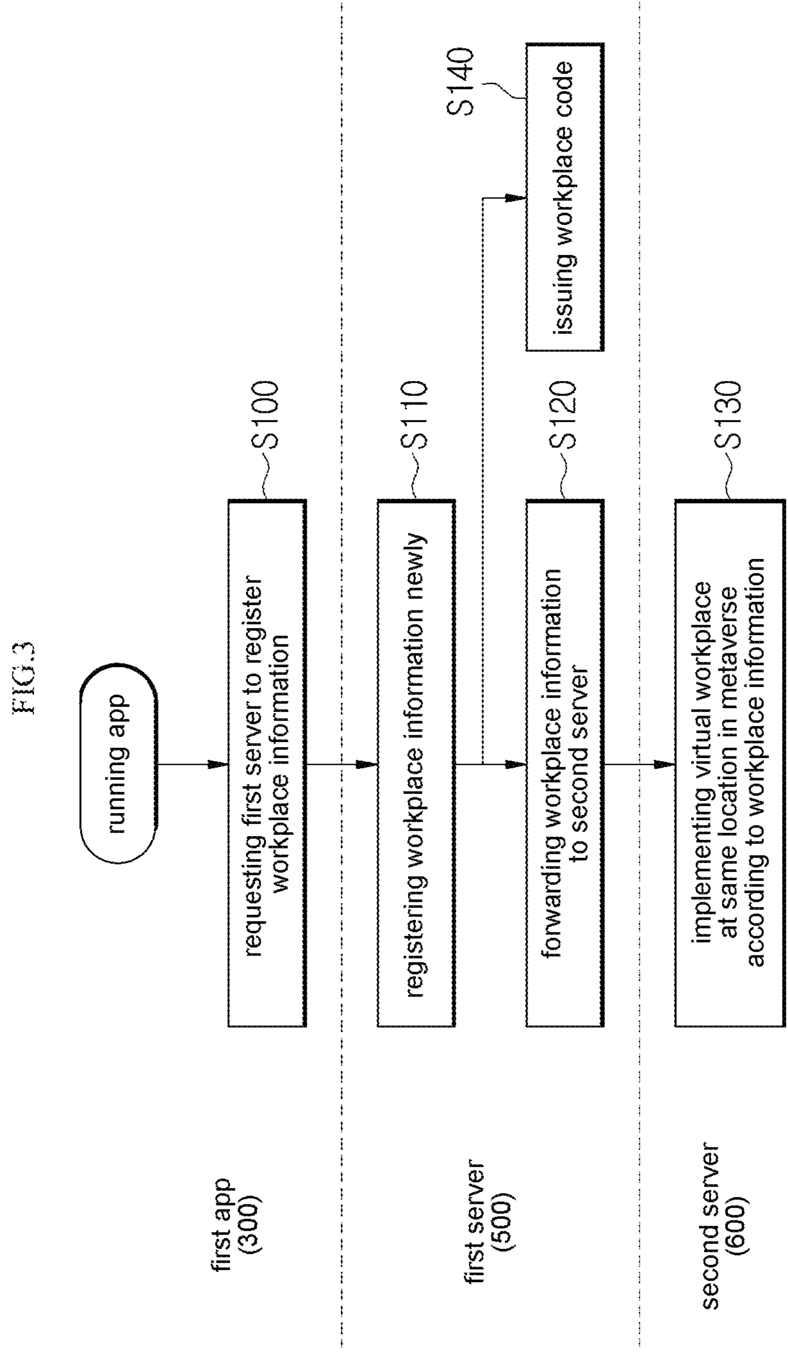
FIGS. 3 to 8 are flowcharts illustrating a method of providing a digital twin service based on reality verification according to an embodiment.

FIG. 2 is a block diagram illustrating a mobile terminal according to an embodiment, and illustrates the configuration of the first terminal 100 and the second terminal 200. The mobile terminal may include at least one selected from the group of a storage part 110, a display part 120, a communication part 130, a GPS receiver 140, a camera part 150, an RFID reader 160, an NFC reader 170, a beacon receiver 180, and a terminal controller 190. In the storage part 110, instructions, data, and programs for operating the mobile terminal 100 may be stored, and the first application 300 or the second application 400 may also be recorded and managed in the form of program code. The display part 120 provides a screen that enables a user to use the first application 300 or the second application 400, and may be a touchscreen capable of outputting a screen and receiving input from the user. The communication part 130 is a communication module for transmitting and receiving data to and from a management server 300. The GPS receiver 140 is a receiver that receives GPS signals from a Global Positioning System (GPS) satellite, as is well known.

The camera part 150, the RFID reader 160, the NFC reader 170, and the beacon receiver 180 are also well known in themselves, and are used in the present disclosure as a means for obtaining a workplace code from a barcode, a quick-response (QR) code, an RFID tag, an NFC tag, or a beacon provided at the workplace. That is, the workplace code is recorded on the barcode, the QR code, the radio-frequency identification (RFID) tag, or the near-field communication (NFC) tag provided at the workplace and may be obtained through the camera part 150, the RFID reader 160, or the NFC reader 170. A wireless transmission signal of the beacon installed in the workplace may be received through the beacon receiver 180 and the workplace code may be obtained from the received signal. The above is illustrative, and workplace information may be obtained through other already-known means or new means that may emerge in the future.

The terminal controller 190 generally controls the mobile terminal and includes at least one processor. The processor of the terminal controller 190 loads and runs the first application 300 or the second application 400 stored in the storage part 110 to enable the user to use the first application 300 or the second application 400.

Hereinafter, an example of a method of providing a digital twin service based on reality verification will be described with reference to FIGS. 3 to 6. First, FIG. 3 will be described. The first application 300 receives offline workplace information of the first user from the first user, and transmits the received workplace information to the first server to request registration in step S100. The workplace information may include a workplace location, and may further include at least some of the following: a business owner name, a workplace name (company name), a type of business, a business registration certificate, and an image of the workplace. The first server 500 receives the workplace information from the first application 300 and registers the workplace information newly in a database in step S110. Herein, the first server 500 may check whether the received workplace information is pre-registered workplace information, and when it is determined that the received workplace information is unregistered workplace information, the first server 500 may register the received workplace information newly in the database.

The first server 500 forwards the workplace information newly registered to the second server 600 in step S120. Through this, the second server 600 implements the virtual workplace for the offline workplace at the same location in the metaverse. In an embodiment, when workplace information is newly registered, the first server 500 forwards the workplace information to the second server 600. In another embodiment, the first server 500 forwards all pieces of business owner information newly registered in the database to the second server 600 only upon request from the second server 600. The second server 600 receives the workplace information from the first server 500, and implements the virtual workplace in the metaverse according to the received workplace information, wherein the second server 600 implements the virtual workplace at the coordinates in the metaverse corresponding to the reality location of the offline workplace identified through the workplace information in step S130.

Additionally, the first server 500 may issue a unique workplace code for the offline workplace newly registered, in step S140. The workplace code may be a tangible barcode or quick-response (QR) code that may be visually represented, or may be intangible data that is not visually represented. The first server 500 may generate such a workplace code and transmit the generated workplace code to the first application 300 over the communication network. Alternatively, when the workplace code is a visual code, such as a barcode or a QR code, the workplace code is printed out and may be provided to the first user, for example through delivery. In addition, when the workplace code issued to the first user is a visual code, the visual code may be displayed on an electronic device in the offline workplace or attached in the form of an object, such as a sticker, and used by users. When the workplace code is intangible data, the intangible data may be recorded in an RF tag, an NFC tag, or a beacon and used by users.

Figure 4:
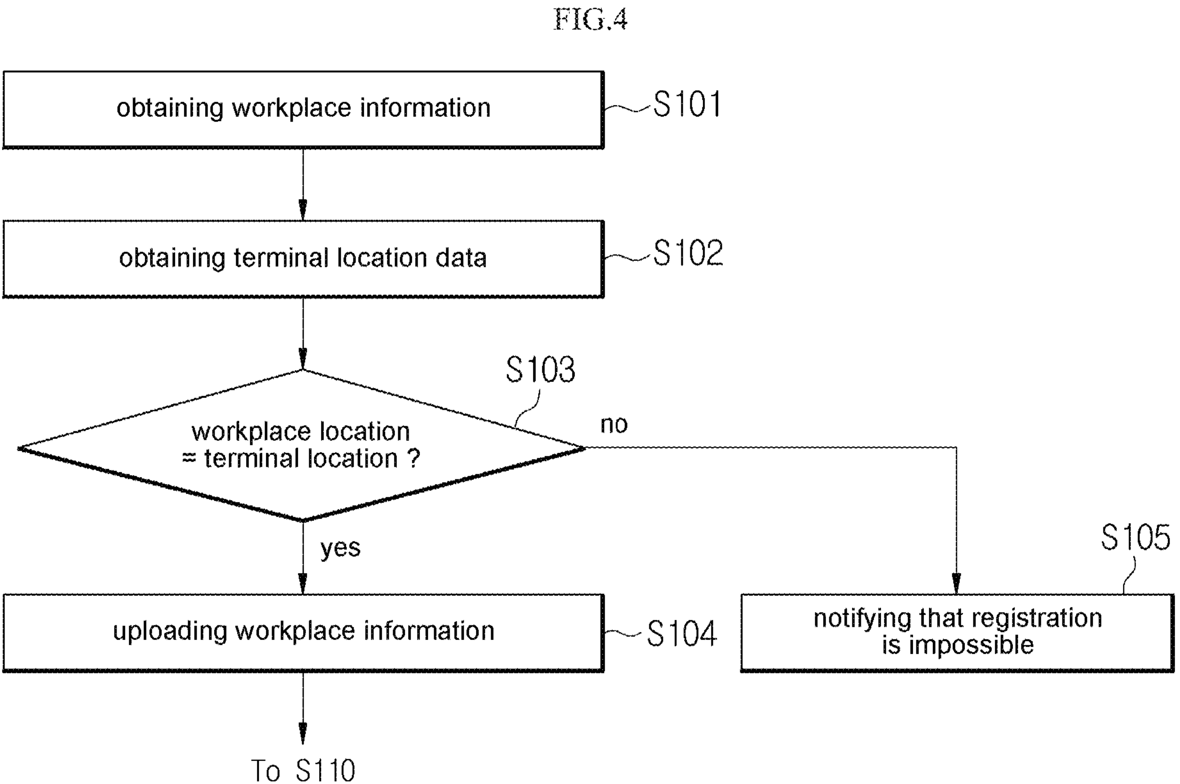

In the meantime, the workplace information may be newly registered in the database only when the location of the first terminal 100 matches the workplace location. An embodiment for this is shown in FIG. 4. FIG. 4 is a detailed flowchart of S100 shown in FIG. 3. The first application 300 obtains workplace information from the first user and obtains location data of the first terminal 100 in steps S101 and S102. The hardware resources used in obtaining the terminal location may be the GPS receiver 140.

The first application 300 compares the workplace location included in the workplace information and the obtained terminal location to determine whether the workplace location and the obtained terminal location match in step S103. That is, it is determined whether the terminal location belongs to the workplace location through comparison. Herein, considering an error of the terminal location, it may be determined whether the terminal location and the store location match within a predetermined error range, through comparison. As a result of comparative determination, when the terminal location and the workplace location match, the first application 300 uploads the workplace information to the first server 500 in step S104. However, when the terminal location and the workplace location do not match, the first user is notified that registration of the workplace information is impossible in step S105.

For example, the workplace information includes a business registration certificate. In addition, the first application 300 analyzes the business registration certificate to extract workplace location information (workplace address), and may compare the workplace address and the terminal location in step S103. Herein, the workplace address may be converted to location coordinate data and the location coordinate data may be compared with the terminal location. In addition, the first application 300 may upload the workplace information to the first server 500 without performing step S103, and instead, the first server 500 may compare the workplace location and the terminal location to determine whether the workplace location and the terminal location match, and may register or not register the workplace information.

Figure 5:
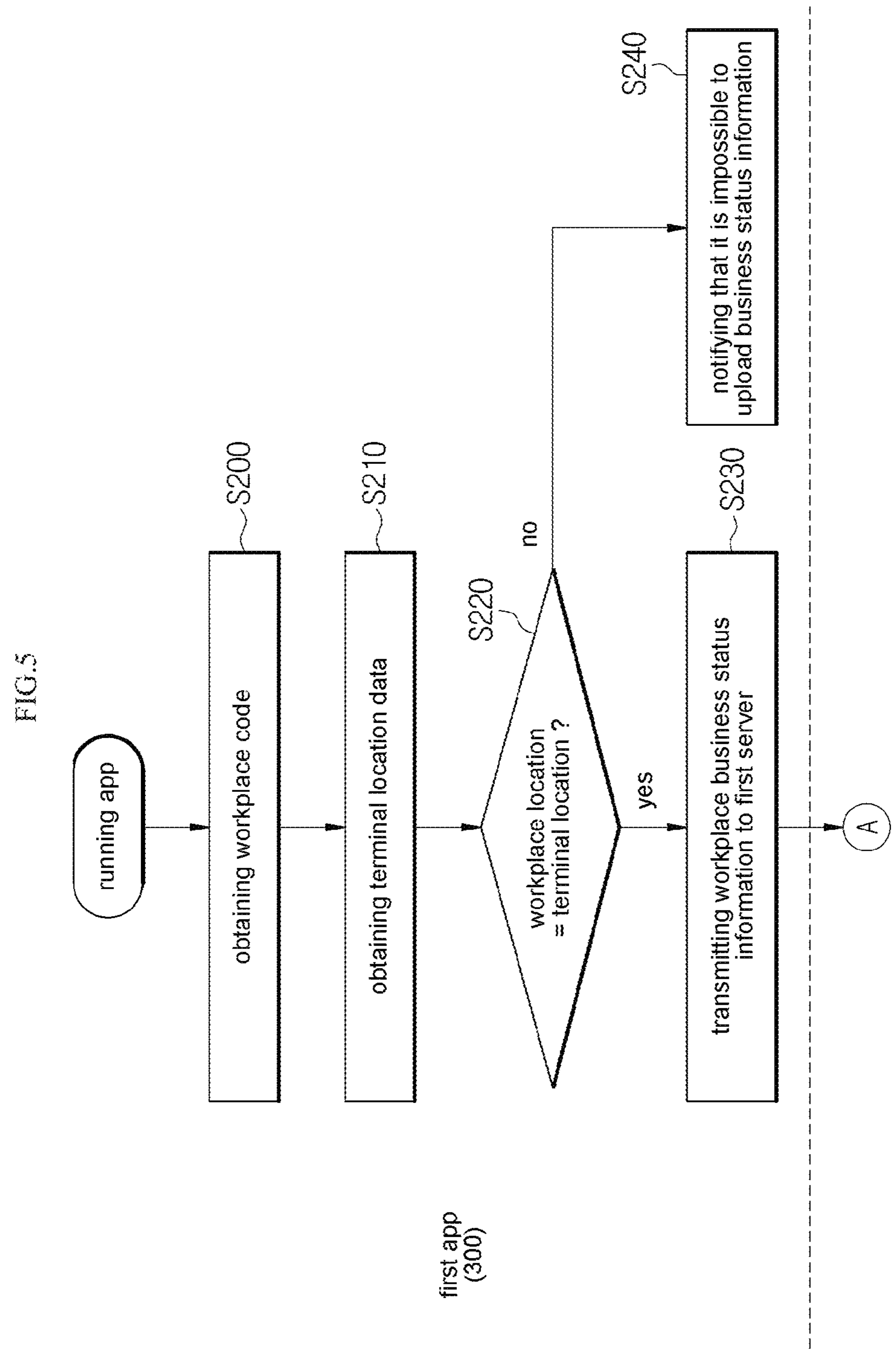
Figure 6:
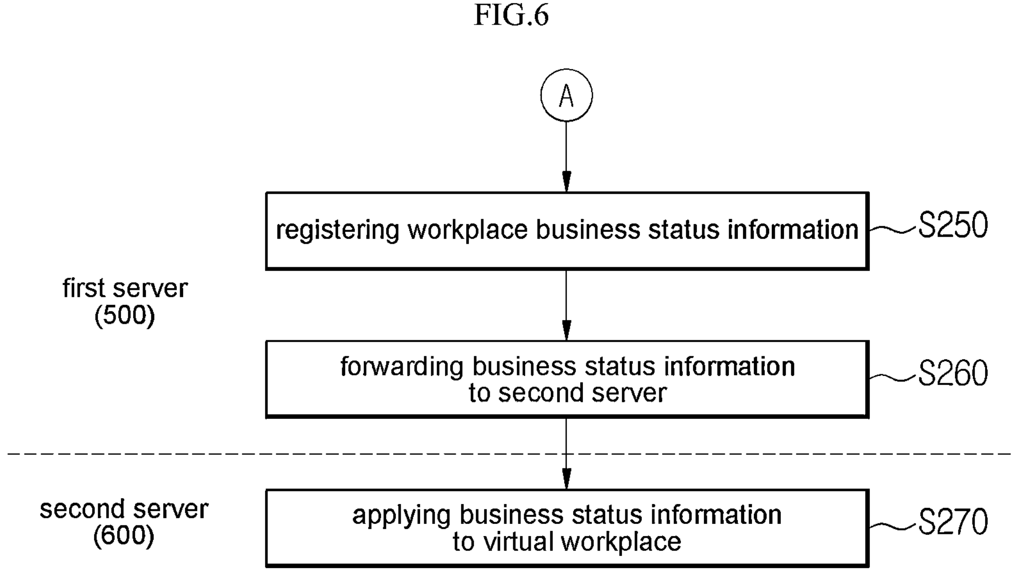

FIGS. 5 and 6 will be described. FIGS. 5 and 6 show the procedure after the workplace code is issued, which is the procedure for performing reality verification on the business status of the offline workplace and applying the business status information of the offline workplace to the virtual workplace in the metaverse on the basis of the verification. The first application 300 obtains a workplace code provided in the offline workplace in step S200. The hardware resources used herein may be the camera part 150, the RFID reader 160, the NFC reader 170, the beacon receiver 180, or something else. The workplace code may include workplace location data, and may also include a workplace identifier (ID) for identifying the workplace. In addition, the first application 300 also obtains location data of the first terminal 100 in step S210.

The first application 300 compares the workplace location and the terminal location to determine whether the workplace location and the terminal location match in step S220. That is, it is determined whether the terminal location belongs to the workplace location through comparison. Herein, considering an error of the terminal location, it may be determined whether the terminal location and the store location match within a predetermined error range, through comparison. As a result of comparative determination, when the terminal location and the workplace location match, the first application 300 uploads the workplace business status information input from the first user, to the first server 500 in step S230. In an embodiment, when it is determined that the two locations match in step S220, the first application 300 requests the first user to input the workplace business status information, and transmits the workplace business status information input upon request, to the first server 500. The business status information may be information indicating open for business, scheduled to close for business, or closed for business, and may be transmitted together with the workplace ID. In addition, when it is determined that the terminal location and the workplace location do not match in step S220, the first application 300 notifies the first user that it is impossible to upload the business status information in step S240.

The first server 500 registers the workplace business status information received from the first application 300 in the database for update and forwards the business status information to the second server 600 in steps S250 and S260. The workplace ID may be also forwarded together so that the second server 600 can identify the offline workplace. In addition, the second server 600 receives the business status information from the first server 500 and applies the received business status information to the virtual workplace in the metaverse in step S270. For example, according to the business status information, the second server 600 may open the virtual workplace for business, notify users who are visiting the virtual workplace that the virtual workplace is scheduled to close for business, or close the virtual workplace for business. As another example, the second server 600 maintains the business of the virtual workplace and provides information about the business status of the offline workplace to users who are visiting the virtual workplace.

In the meantime, although not shown in FIGS. 5 and 6, when the business status information is not received from the first application 300 for predetermined period of time (for example, one week), the first server 500 may report this to the second server 600. In addition, according to the report from the first server 500, the second server 600 may end the operation of the virtual workplace in the metaverse.

Figure 7:
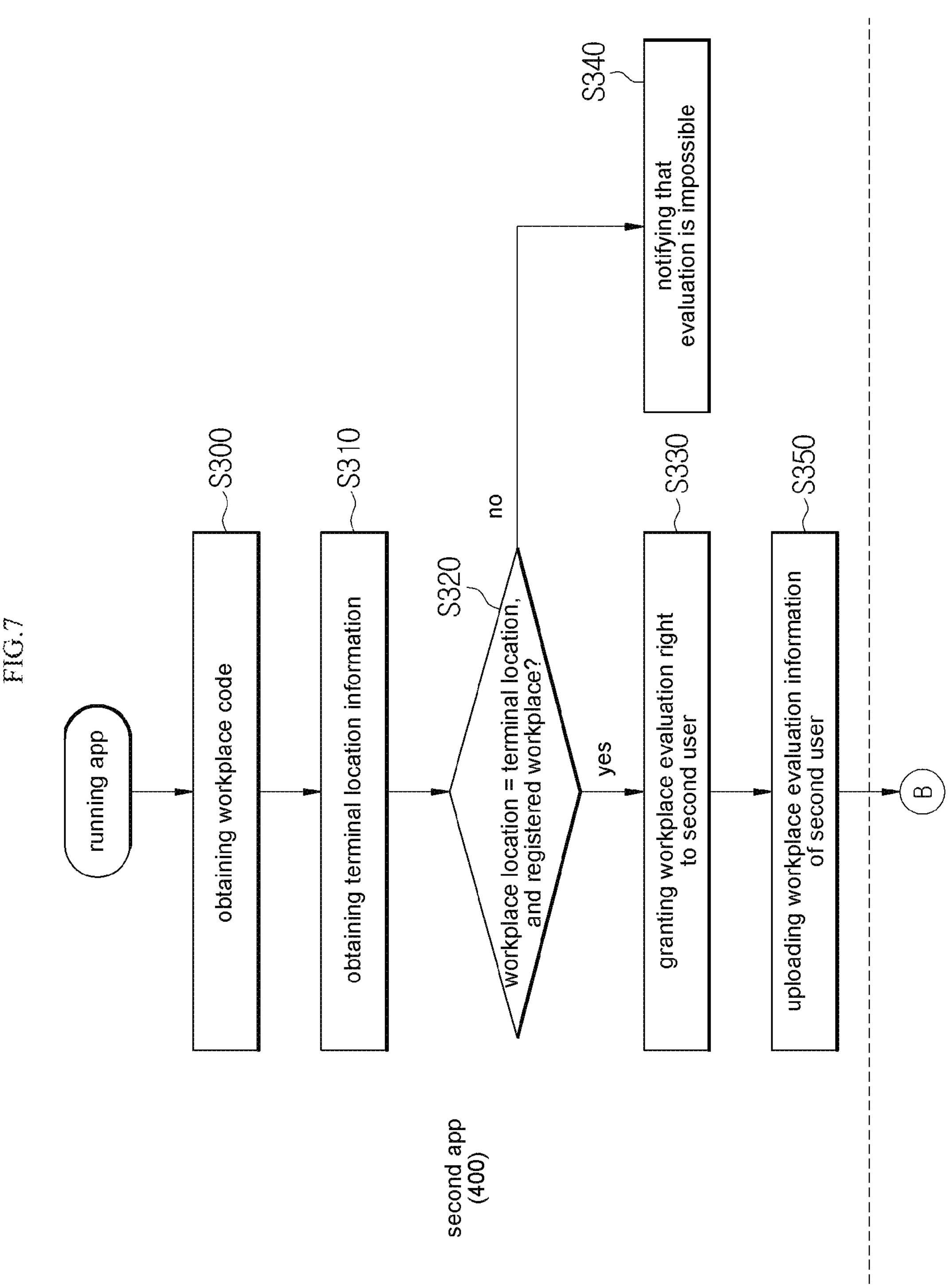
Figure 8:
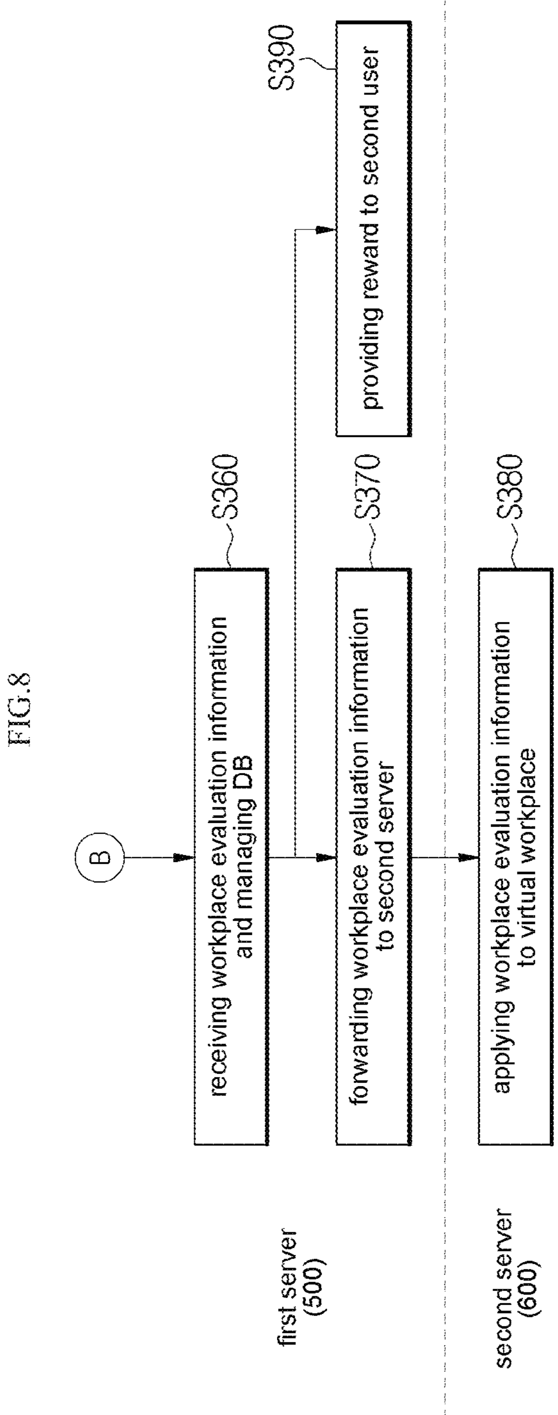

FIGS. 7 and 8 will be described. FIGS. 7 and 8 also show the procedure after the workplace code is issued. The second application 400 obtains the workplace code provided in the offline workplace and also obtains location data of the second terminal 200 in steps S300 and S310. Steps S300 and S310 are substantially the same as steps S200 and S210 performed by the first application 300 shown in FIG. 5. The second application 400 determines whether the workplace location and the terminal location match and the workplace is the workplace registered in the first server 500 in step S320. Whether the workplace is the registered workplace is determined by making an inquiry to the first server 500 with the workplace ID belonging to the workplace code.

When it is determined that the result is 'Yes' in step S320, the second application 400 grants an evaluation right for the offline workplace to the second user in step S330. However, when it is determined that the result is 'No', the second application 400 notifies the second user that evaluation is impossible because of lack of an evaluation right in step S350. Subsequent to step S330, the second user performs an evaluation of the workplace where he or she has actually visited, through the second application 400, and the second application 400 uploads workplace evaluation information obtained according to the user's evaluation, to the second server 600 in step S350. Herein, the workplace ID may also be transmitted to the second server 600.

The second server 600 receives the workplace evaluation information from the first application 300 and registers the workplace evaluation information in the database for management in step S360, and the workplace evaluation information is forwarded to the second server 600 in step S370. In step S37, the workplace ID may also be forwarded. In addition, the second server 600 receives the workplace evaluation information from the first server 500 and applies the received workplace evaluation information to the virtual workplace in the metaverse in step S380. For example, the second server 600 may expose the workplace evaluation information within the virtual workplace so that users visiting the virtual workplace can view the details of the evaluation of the actual workplace.

In the meantime, when the workplace evaluation information is received from the second application 400, the first server 500 may provide a reward to the second user through the second application 400 in step S390. The reward may be digital coupons or points that can be used like cash at the offline workplace or the virtual workplace corresponding thereto, for example, but is not limited thereto.

Figure 9:
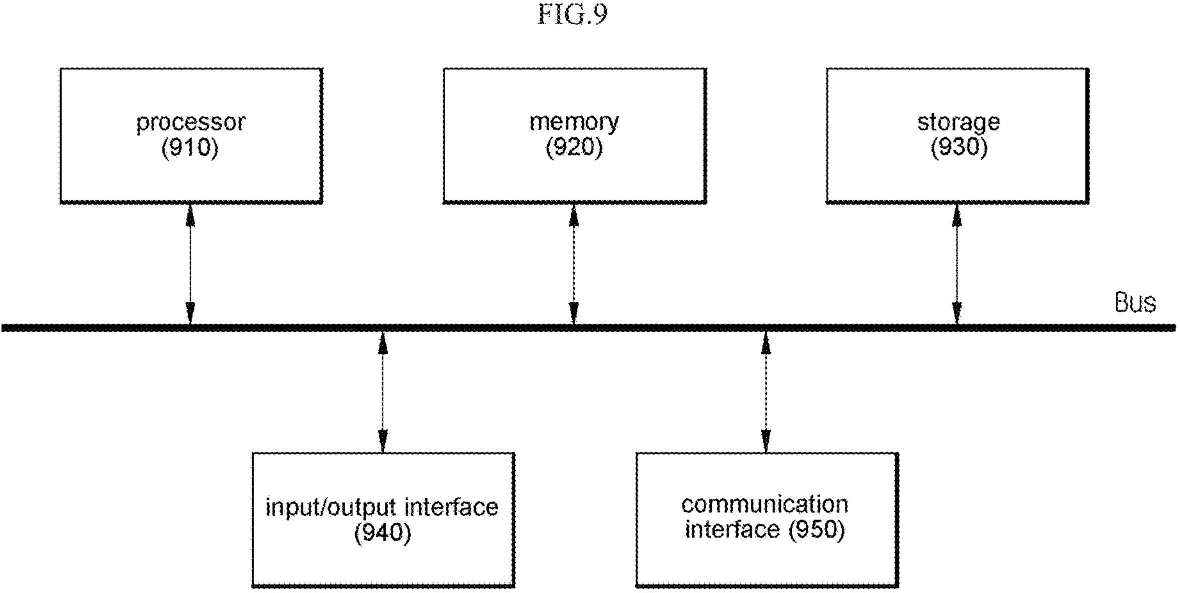
FIG. 9 is a diagram illustrating an example of the configuration of a server computing device.

FIG. 9 is a diagram illustrating an example of the configuration of a server computing device. Each of the first server 500 and the second server 600 includes at least one server computing device to perform the above-described process. As shown in FIG. 9, the computing device may include a processor 910, a memory 920, a storage 930, an input/output interface 940, and a communication interface 950. The processor 910 may include a central processing unit (CPU), a graphics processing unit (GPU), or a micro processor equipped with at least one processing core similar thereto. In the memory 920, data, and a program for execution by the processor 910 may be stored. The memory 920 may include at least one volatile memory and at least one non-volatile memory, and may be internal or distributed memory. The storage 930 may be for a database, and may include a non-transitory storage. The storage 930 may include at least some of the following: a hard disk drive, flash memory, an optical disk, a magneto-optical disk, and a universal serial bus (USB) drive.

The input/output interface 940 may include at least one input and/or output device that enables a user to provide input, receive output, and exchange data with other computing devices. The input/output interface 940 may be a mouse, a keypad or keyboard, a camera, an optical scanner, a network interface, a modem, or other known I/O devices, or may include a combination thereof. The input/output interface 940 may include at least some of the following: a graphics engine, a display, at least one output driver (for example, a display driver), at least one audio speaker, and at least one audio driver. The communication interface 950 may provide at least one interface for network communication (for example, packet-based communication) with other computing devices. For example, the communication interface 950 may include a network interface controller (NIC) or a network adaptor for communication over Ethernet or other wired networks, or may include a wireless NIC or a wireless adaptor for communication over a wireless network, such as Wi-Fi.

In the meantime, a bus may include hardware, software, or both for connecting the components of the computing device to each other. For example, the bus may include Accelerated Graphics Port (AGP) or other graphics buses, an Enhanced Industry Standard Architecture (EISA) bus, a front-side bus (FSB), a hypertransport (HT) interconnect, an Industry Standard Architecture (ISA) bus, an INFINIBAND interconnect, a low-pin-count (LPC) bus, a memory bus, an Micro Channel Architecture (MAC) bus, a Peripheral Component Interconnect (PCI) bus, a PCI-Express (PCIe) bus, a serial technology attachment (SATA) bus, a Video Electronics Standards Association Local (VESA Local, VL) bus, other suitable buses, or a combination thereto. The above components of FIG. 9 are exemplary, so the computing device may include only some of the components show in FIG. 9, and may also include other components not shown.

The exemplary embodiments of the present disclosure have been particularly described. It will be understood by those skilled in the art that various changes in form are possible without departing from the essential features of the disclosure. Thus, the exemplary embodiments should be considered in a descriptive sense only and not for purposes of limitation. Therefore, the scope of the disclosure is defined not by the detailed description of the disclosure but by the following claims, and all differences within the scope will be construed as being included in the exemplary embodiments.

The invention claimed is:

1. A method of providing a digital twin service based on reality verification, the method comprising:

receiving, by a first application executed on a mobile terminal of a first user, workplace information comprising at least one of a workplace location, a business registration certificate, and business metadata associated with a real-world workplace managed by the first user;

transmitting, by the first application, the workplace information to a first server;

receiving, by the first server, the workplace information and performing an initial reality verification of the workplace information by comparing geolocation data of the mobile terminal with the workplace location included in the workplace information to confirm that the mobile terminal is physically present at the real-world workplace;

registering, by the first server, the workplace information in a database upon successful initial reality verification, wherein registration is permitted only when the geolocation data of the mobile terminal matches the workplace location;

forwarding, by the first server, the verified and registered workplace information to a second server; and instantiating, by the second server, a virtual workplace within a metaverse environment based on the forwarded workplace information, the virtual workplace being positioned at coordinates in the metaverse corresponding to the location of the real-world workplace, thereby creating a verified digital twin that reflects only real-world workplaces whose physical existence has been confirmed;

wherein the first application is further configured to analyze the business registration certificate to extract a workplace address, and to convert the workplace address into coordinate data representing the workplace location prior to transmitting the workplace information to the first server, such that the geolocation data of the mobile terminal is compared against coordinate data derived by processing of the business registration certificate rather than against a user-inputted address; and wherein, upon successful initial reality verification and registration of the workplace information in the database, the first server generates a workplace code comprising a workplace identifier (ID) and location data indicative of the verified workplace location, and transmits the workplace code to the first user, the workplace code being physically placed at the real-world workplace and configured to be read by a mobile terminal to enable subsequent reality verification of physical presence at the real-world workplace.

2. The method of claim 1, further comprising:

obtaining, by the first application executed on the mobile terminal, the workplace code;

acquiring, by the first application, a current location of the mobile terminal;

determining, by the first application, that the current location of the mobile terminal matches the location data included in the workplace code within a predetermined error range, thereby performing a second reality verification confirming that the first user is physically present at the workplace;

transmitting, by the first application, business status information of the real-world workplace to the first server only in response to the location match confirming physical presence, the business status information indicating operational activity of the workplace;

forwarding, by the first server, the business status information to the second server; and updating, by the second server, the virtual workplace in the metaverse environment based on the received business status information to reflect the current operational status of the real-world workplace through ongoing reality verification.

3. The method of claim 2, further comprising:

in response to the business status information received from the first server, performing, by the second server, at least one of:

opening the virtual workplace for business in the metaverse environment, notifying second users visiting the virtual workplace that the virtual workplace is scheduled to close for business; and closing the virtual workplace for business in the metaverse environment, wherein the second server is configured to maintain an operational state of the virtual workplace and to provide the second users visiting the virtual workplace with updated information reflecting the verified business status information of the corresponding real-world workplace.

4. The method of claim 2, wherein a second application executed on a mobile terminal of a second user is configured to:

obtain the workplace code physically provided at the real-world workplace;

execute the workplace code on the mobile terminal of the second user;

acquire the location data of the mobile terminal of the second user;

determine whether the workplace location corresponding to the workplace code matches the acquired current location of the mobile terminal of the second user; and verify, via an inquiry to the first server using the workplace ID included in the workplace code, whether the workplace is registered in the first server, thereby confirming the physical existence of the real-world workplace before granting further access.

5. The method of claim 1, wherein, the first application is further configured to:

transmit the workplace information to the first server, wherein the first server performs a comparison between the coordinate data of the workplace location derived from the business registration certificate and the current location of the mobile terminal to determine whether the workplace information should be registered based on a location match, thereby performing server-side reality verification of the physical existence of the workplace.

6. The method of claim 1, further comprising:

comparing the current location of the mobile terminal with the workplace location contained in stored workplace information to determine whether the current location of the mobile terminal matches the workplace location within a predetermined error range.

7. The method of claim 6, wherein, when the current location of the mobile terminal and the workplace location are determined to match within the predetermined error range, the workplace information is uploaded from the first application executed on the mobile terminal to the first server.

8. The method of claim 6, wherein, when the current location of the mobile terminal and the workplace location are determined not to match within the predetermined error range, the first application notifies the first user that registration of the workplace information is not permitted.

* * * * *